US009979718B2

(12) United States Patent
Kurian

(10) Patent No.: US 9,979,718 B2
(45) Date of Patent: May 22, 2018

(54) SYSTEM FOR MANAGING SECURITY AND ACCESS TO RESOURCE SUB-COMPONENTS

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 196 days.

(21) Appl. No.: 15/152,317

(22) Filed: May 11, 2016

(65) Prior Publication Data
US 2017/0331810 A1 Nov. 16, 2017

(51) Int. Cl.
G06F 21/00 (2013.01)
H04L 29/06 (2006.01)
G06F 3/06 (2006.01)

(52) U.S. Cl.
CPC ............ H04L 63/083 (2013.01); G06F 3/064 (2013.01); G06F 3/067 (2013.01); G06F 3/0622 (2013.01)

(58) Field of Classification Search
CPC ............................... H04L 63/083; G06F 3/064
See application file for complete search history.

(56) References Cited

U.S. PATENT DOCUMENTS 5,671,283 A 9/1997 Michener et al.
5,835,599 A 11/1998 Buer
6,324,286 B1 11/2001 Lai et al.
6,973,187 B2 12/2005 Gligor et al.
7,055,039 B2 5/2006 Chavanne et al.
7,092,400 B2 8/2006 Malzahn
7,184,549 B2 2/2007 Sorimachi et al.
7,362,859 B1 4/2008 Robertson et al.
7,392,384 B2 6/2008 Hopkins et al.
7,428,306 B2 9/2008 Celikkan et al.
7,649,992 B2 1/2010 Raju et al.
(Continued)

OTHER PUBLICATIONS

Zyskind et al, Decentralizing Privacy: Using Blockchain to Protect Personal Data,2015 IEEE CS Security and Privacy Workshops, pp. 182-184.*

(Continued)

Primary Examiner — Ali Shayanfar
(74) Attorney, Agent, or Firm — Michael A. Springs; Moore & Van Allen PLLC; James C. Edwards

(57) ABSTRACT

A means for managing security and access to resources associated with blocks/sub-components of a distributed validating network, such as a blockchain network. Tags are created that can be applied to blocks so that a designated entity/user can locate the block though presentation of keywords associated with the tag. Additionally, a security token is generated that is assigned or otherwise provided to the designated entity/user which is configured to grant the designated entity access to resources in the block. Further, logic may be defined and applied to either the tag, the block and/or the security token that provides control over the access granted to the designated entities/users. The logic may define the period of time for which a designated entity/user is granted access to the block and/or the block's resources or the logic may define an amount of access granted to the designated entity/user.

19 Claims, 4 Drawing Sheets

(56) References Cited

U.S. PATENT DOCUMENTS

| | | | |
|---|---|---|---|
| 7,764,788 B2* | 7/2010 | Tardo | H04L 9/0625 380/37 |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2* | 4/2013 | Schneider | H04L 9/0625 380/28 |
| 8,458,461 B2 | 6/2013 | Tardo | |
| 8,590,055 B2 | 11/2013 | Yoon et al. | |
| 8,737,606 B2* | 5/2014 | Taylor | H04L 9/0662 380/28 |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,608,829 B2* | 3/2017 | Spanos | H04L 9/3297 |
| 9,749,297 B2* | 8/2017 | Gvili | H04L 63/0428 |
| 2006/0012465 A1* | 1/2006 | Lee | G06K 7/0008 340/10.2 |
| 2015/0172053 A1 | 6/2015 | Schwarz et al. | |
| 2015/0206106 A1 | 7/2015 | Yago | |
| 2016/0134593 A1* | 5/2016 | Gvili | H04L 63/0428 713/170 |
| 2017/0046651 A1* | 2/2017 | Lin | G06Q 20/0655 |
| 2017/0046652 A1* | 2/2017 | Haldenby | G06Q 20/0655 |
| 2017/0046693 A1* | 2/2017 | Haldenby | G06Q 20/0655 |
| 2017/0140375 A1* | 5/2017 | Kunstel | G06Q 20/40 |
| 2017/0228731 A1* | 8/2017 | Sheng | G06Q 20/401 |
| 2017/0237570 A1* | 8/2017 | Vandervort | H04L 9/3247 713/176 |

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

* cited by examiner

SYSTEM FOR MANAGING SECURITY AND ACCESS TO RESOURCE SUB-COMPONENTS

FIELD

In general, embodiments of the invention relate to network security and access control and, more specifically, managing security and access to resources associated with blocks (i.e., subcomponents) within a distributed/decentralized blockchain network.

BACKGROUND

With the advent of distributed/decentralized blockchain networks, in which resources, may be registered and subsequently validated via various nodes in the network, a need exists to develop systems, apparatus, computer program products, methods and the like that manage control over blocks of resources associated with a blockchain network. Specifically, a need exists to provide designated entities/users the ability to readily identify blocks that are relevant to the designated users' concern and, once blocks have been identified, security features that assure that the designated entities/user that are accessing the blocks are, in fact, authorized users. Moreover, a need exists to control the access given to the designated entities/users, such as, by way of example, control over the period of time during which a designated entity may be granted access and/or the amount of access granted to the designated entity/user.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for managing the security and access to resources associated with blocks (i.e., sub-components) of a decentralized distributed blockchain network. Blockchain networks provide the ability to validate resources, as such the individual or entity that own/control or are otherwise associated with the resources, may, in specific instances, have a desire to grant other individuals/entities (e.g., third-parties, parties in interest or the like) access to the resources (i.e., individuals/entities that have a need to access resources that are validated).

In this regard, the present invention provides for creation of tags (i.e., digital markings) that can be applied to blocks so that a designated entity/user can locate the block though presentation of keywords associated with the tag. Additionally, the invention provides for generating a security token (i.e., feature, key or the like) that is assigned or otherwise provided to the designated entity/user which is configured to grant the designated entity access to resources in the block. Moreover, logic may be defined and applied to either the tag, the block and/or the security token that provides control over the access granted to the designated entities/users. For example, the logic may define the period of time for which a designated entity/user is granted access to the block and/or the block's resources or the logic may define an amount of access granted to the designated entity/user.

A system for self-monitoring security and access to designated blocks within a blockchain network defines first embodiments of the invention. The system includes a distributed blockchain network comprising a plurality of decentralized nodes for storing and validating resources. Additionally, the system includes a computing platform including a memory and at least one processor in communication with the memory. The memory of the computing platform stores an access control module that is executable by the at least one processor. The access control module is configured to, in response to generating one or more blocks within the blockchain network and validating (i.e., validating the resource and/or the identity of the resource holder/owner) one or more resources associated with the one or more blocks, generate and apply to one or more of the blocks one or more tags. Each tag defines at least one attribute associated with one of the blocks. The module is further configured to generate a security token that provides one or more designated users access to one or more of the blocks and define logic that is applied to at least one of (i) the one or more tags, (ii) the one or more blocks, or (iii) the security token. The logic provides access criteria for the one or more designated users when accessing the one or more of the blocks. In addition, the access control module is further configured to grant the one or more designated users access to at least a portion of the resources associated with the block based on presentation of the security token and application of the logic.

In specific embodiments the system further includes an access portal module that is stored in the memory and executable by the at least one processor. The access control portal module is configured to receive one or more search terms associated with at least one of the one or more tags and, in response to receiving the one or more search terms, locate the one or more of the blocks based on the one or more tags. In addition, the access portal is configured to receive the security token from one of the designated users, and, in response to receiving the security token, grant the designated users access to at least a portion of the resources associated with the one or more of the blocks. In further related specific embodiments, the access portal module is further configured to apply the logic to at least one of the tags, the security token or the blocks prior to granting the designated user access to the resources.

In further specific embodiments of the system, the access control module is further configured to define logic that provides a time period for use associated with at least one of the one or more tags, the one or more of the blocks or the security token. In such embodiments of the system, the time period of use is one of a current time period or a future time period. In specific embodiment the time period further defines a time at which the tag, block and/or security token expires. In other related embodiments of the system, the access control module is further configured to define logic that limits an amount of access afforded to the one or more resources associated with the one or more of the blocks. In specific related embodiments of the system, the amount of access is one of (i) frequency of which the designated users are allowed to access the block, (ii) the level or type of access granted to the one or more resources associated with the one or more of the blocks, and (iii) a threshold limit of the one or more resources that may be accessed.

In further specific embodiments of the system, the one or more blocks are generated, each for separate financial needs or obligations, such that, the resources associated with the block are existing or future existing funds. In such embodiments of the system, one or more of the tags may define a designated purpose for the existing or future existing funds associated with the block. In still further related embodiments of the system, the access control module is further configured to, in response to receiving the security token, grant the one or more designated users access to at least a portion of the funds associated with the one or more of the blocks.

Moreover, in additional embodiments of the system, the access control module is further configured to determine that one or more of the blocks has been compromised based on one of the security token being presented by a non-designated user or an incorrect security token being presented, and, in response to determination that one or more of the clocks has been comprised, generate and apply to the one or more comprised blocks a tag that identifies the one or more comprised blocks as being compromised. In such embodiments of the invention, the access control module is further configured to identify and validate one or more other blocks that are configured to replace the one or more compromised blocks. Replacement provides for granting the one or more designated users access to at least a portion of the resources associated with the one or more other blocks based on presentation of the security token and application of the logic.

An apparatus for self-monitoring security and access to designated blocks within a blockchain network defines second embodiments of the invention. The apparatus includes a computing platform having a memory and at least one processor in communication with the memory. In addition, the apparatus includes an access control module that is stored in the memory and executable by the at least one processor. The access control module is configured to, in response to (i) generating one or more blocks within a blockchain network, and (ii) validating one or more resources associated with the one or more blocks, generate and apply to one or more of the blocks one or more tags. Each tag defines at least one attribute associated with one of the blocks. The access control module is further configured to generate a security token, that provides one or more designated users access to one or more of the blocks. In addition, the access control module defines logic that is applied to at least one of (i) the one or more tags, (ii) the one or more blocks, or (iii) the security token. The logic provides access criteria for the one or more designated users when accessing the one or more of the blocks, The apparatus further includes an access portal module that is stored in the memory and executable by the at least one processor. The access portal module is configured to receive one or more search terms associated with at least one of the one or more tags and, in response to receiving the one or more search terms, locate the one or more of the blocks based on the one or more tags, The access portal module is further configured to receive the security token from one of the designated users, and, in response to receiving the security token, grant the one or more designated users access to at least a portion of the resources associated with the one or more of the blocks.

A method for self-monitoring security and access to designated blocks within a blockchain network defines third embodiments of the invention. The method is conducted in response to (i) generating one or more blocks within a blockchain network and (ii) validating one or more resources associated with the one or more blocks. The method includes generating and applying to one or more of the blocks one or more tags. Each tag defines at least one attribute associated with one of the blocks. The method further includes generating a security token that provides one or more designated users access to one or more of the blocks. In addition the method includes defining logic that is applied to at least one of (i) the one or more tags, (ii) the one or more blocks, or (iii) the security token. The logic provides access criteria for the one or more designated users when accessing the one or more of the blocks. The method further includes granting the one or more designated users access to at least a portion of the resources associated with the block based on presentation of the security token and application of the logic.

Thus, systems, apparatus, methods, and computer program products herein described in detail below provide for managing security and access to resources associated with blocks of a distributed blockchain network. In this regard, as described in detail below, the present invention provides for creation of tags (i.e., digital markings) that can be applied to blocks so that a designated entity/user can locate the block though presentation of keywords associated with the tag. Additionally, the invention provides for generating a security token (i.e., feature, key or the like) that is assigned or otherwise provided to the designated entity/user which is configured to grant the designated entity access to resources in the block. Moreover, logic may be defined and applied to either the tag, the block and/or the security token that provides control over the access granted to the designated entities/users. For example, the logic may define the period of time for which a designated entity/user is granted access to the block and/or the block's resources or the logic may define an amount of access granted to the designated entity/user.

BRIEF DESCRIPTION OF THE DRAWINGS

Figure 1:
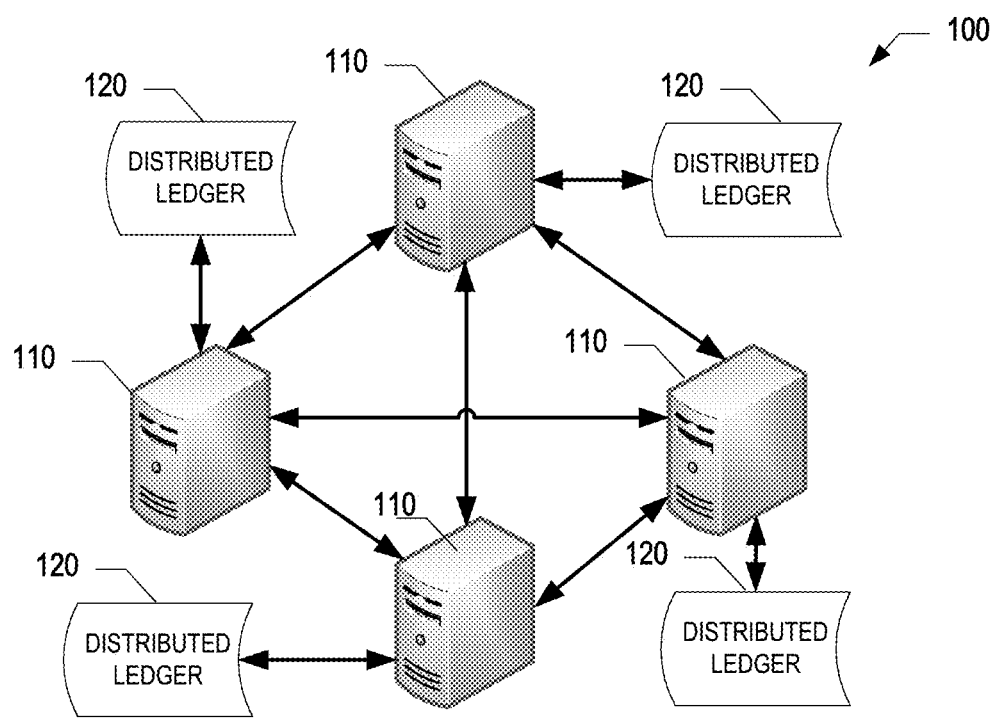
Figure 2:
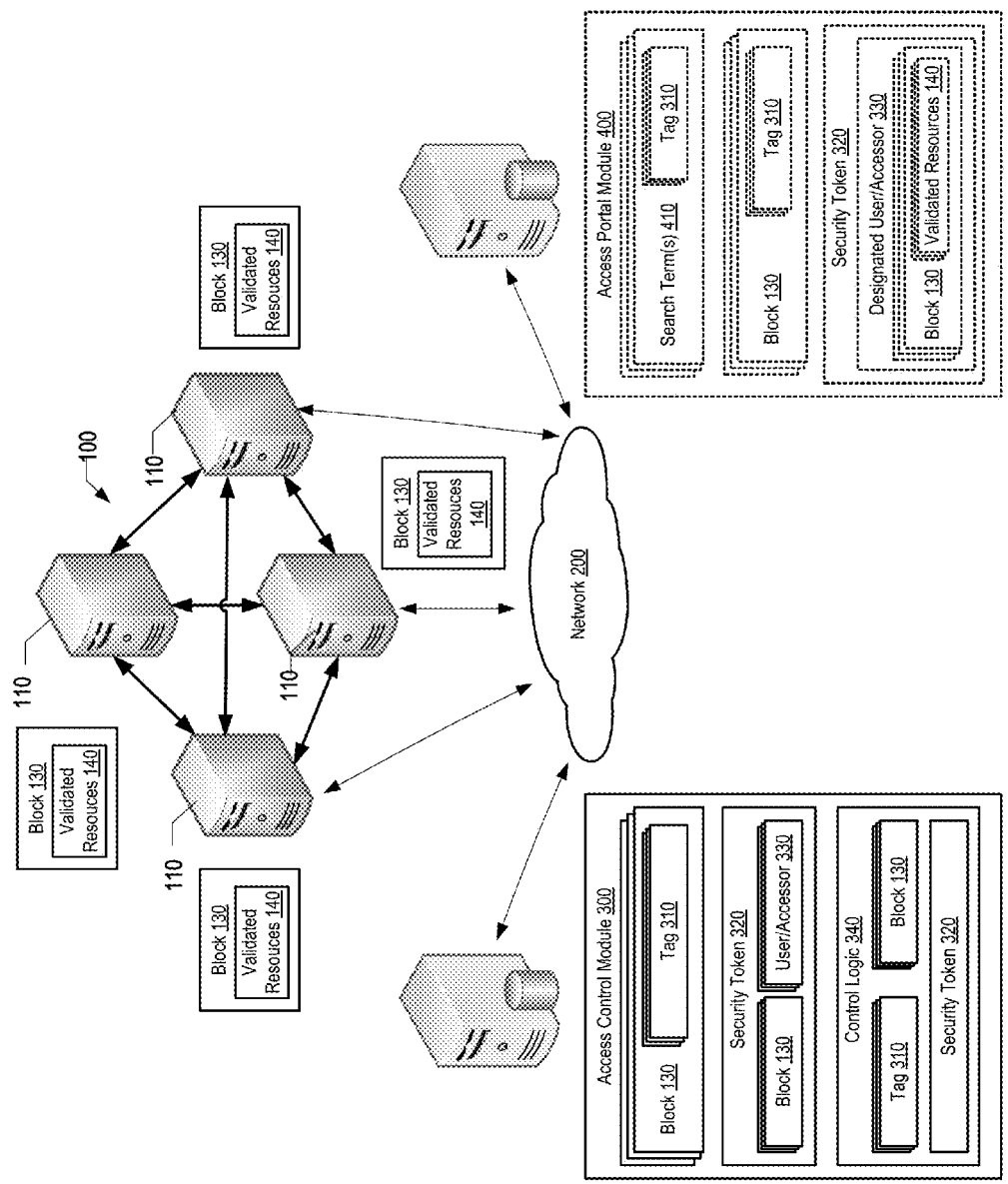
Figure 3:
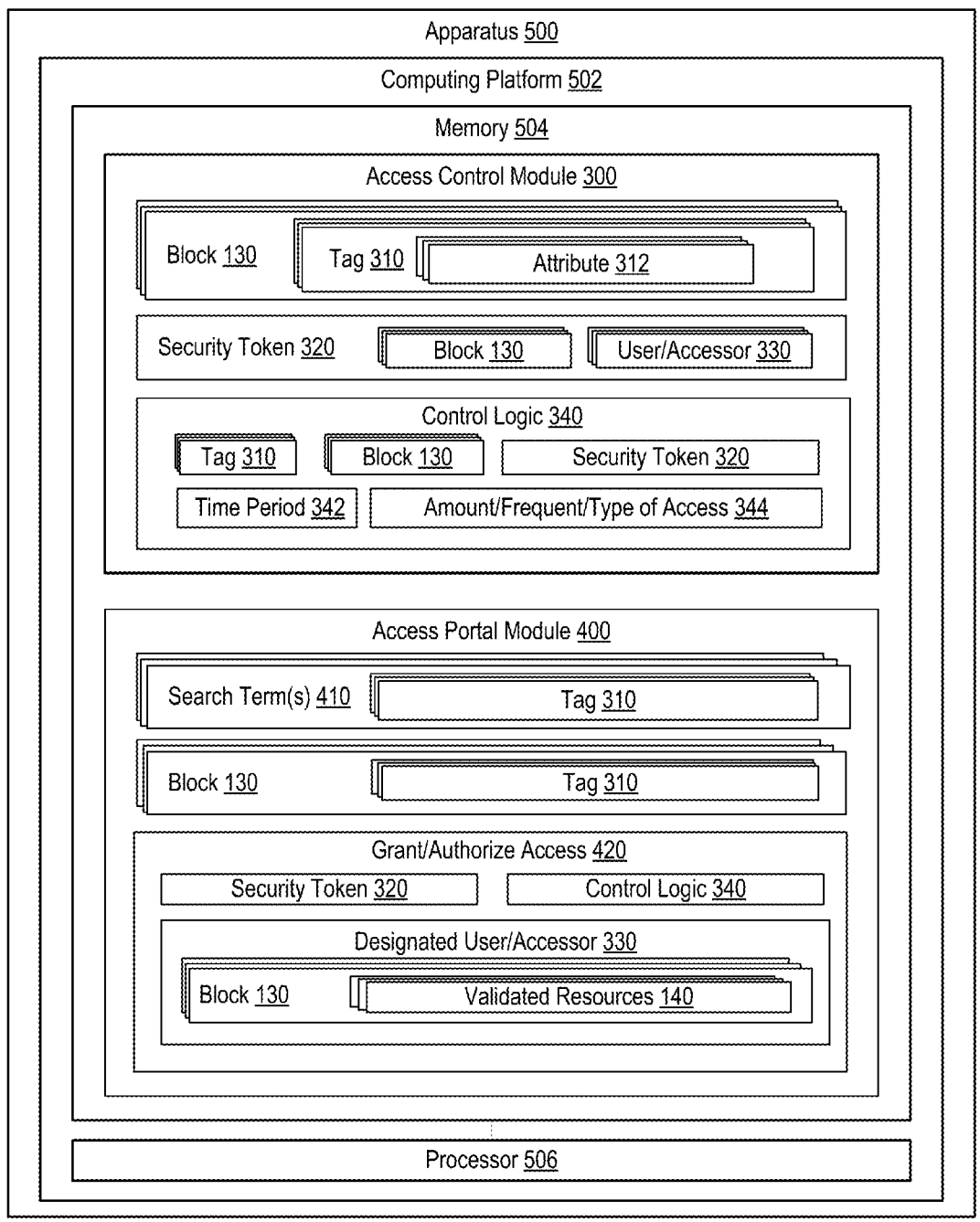
Figure 4:
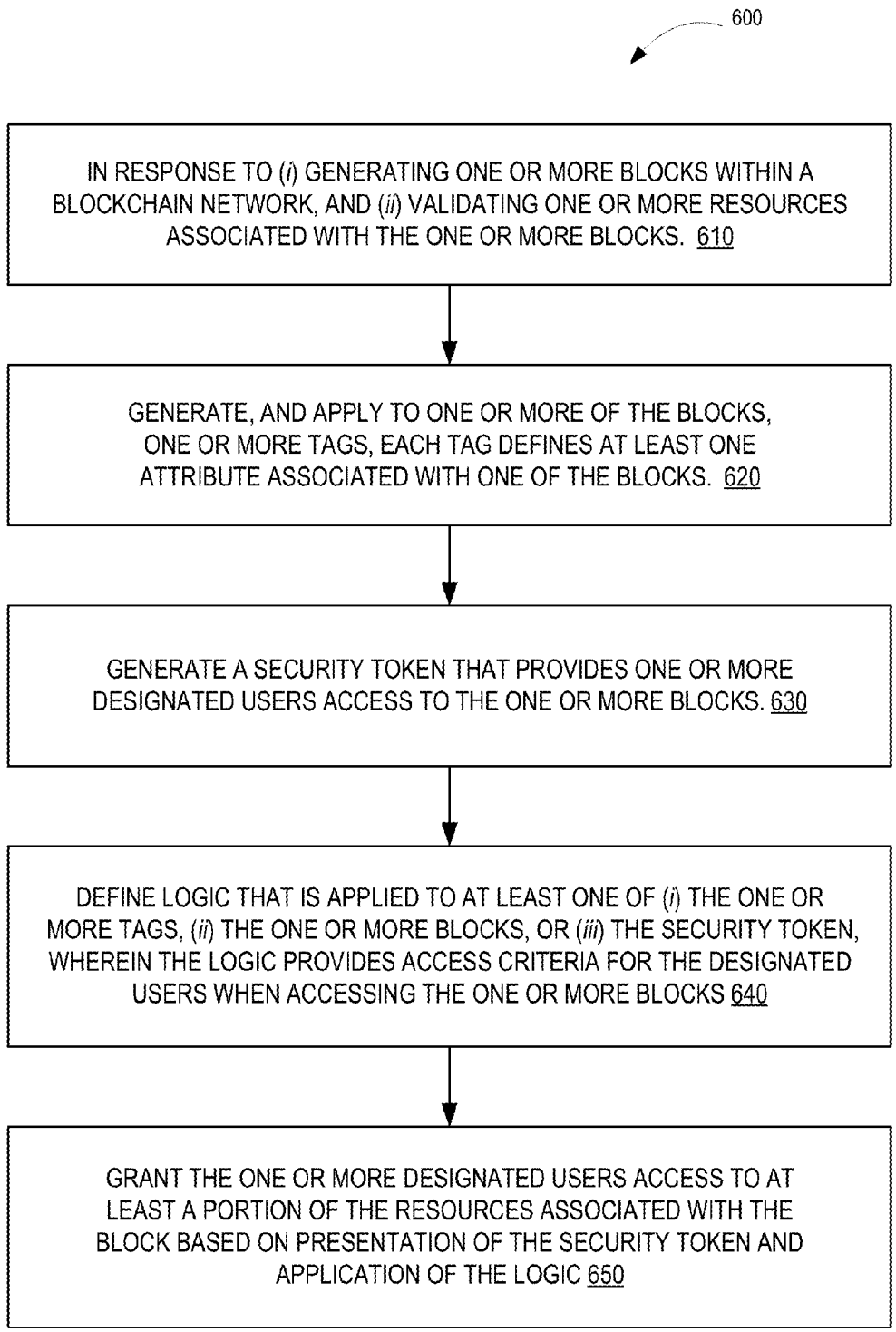

Having thus described embodiments of the invention in general terms, reference will now be made to the accompanying drawings, which are not necessarily drawn to scale, and wherein:

FIG. 1 provides schematic diagram of an exemplary blockchain network, in accordance with embodiments of the present invention;

FIG. 2 provides a schematic diagram of a system for self-monitoring security and access control to designated blocks within a blockchain network, in accordance with embodiments of the present invention;

FIG. 3 provides a block diagram of an apparatus configured for self-monitoring security and access control to designated blocks within a blockchain network, in accordance with embodiments of the present invention; and FIG. 4 provides a flow diagram of a method for self-monitoring security and access control to designated blocks within a blockchain network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for managing the security and access to resources associated with blocks (i.e., sub-components) of a decentralized distributed blockchain network. Blockchain networks provide the ability to validate resources, as such the individual or entity that own/control or are otherwise associated with the resources, may, in specific instances, have a desire to grant other individuals/entities (e.g., third-parties, parties in interest or the like) access to the resources (i.e., individuals/entities that have a need to access resources that are validated).

In this regard, the present invention provides for creation of tags (i.e., digital markings) that can be applied to blocks so that a designated entity/user can locate the block though presentation of keywords associated with the tag. Additionally, the invention provides for generating a security token (i.e., feature, key or the like) that is be assigned or otherwise provided to the designated entity/user which is configured to grant the designated entity access to resources in the block. Moreover, logic may be defined and applied to either the tag, the block and/or the security token that provides control over the access granted to the designated entities/users. For example, the logic may define the period of time for which a designated entity/user is granted access to the block and/or the block's resources or the logic may define an amount of access granted to the designated entity/user.

A blockchain (otherwise referred to as a "block chain") is a distributed database that maintains resources, e.g., a list of data records or the like. In specific embodiments of the invention the resources may comprise financial resources, such as a designated portion of one or more financial accounts. The security of the resources maintained within a blockchain is enhanced by the distributed nature of the block chain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A blockchain provides numerous advantages over traditional databases. A large number of nodes of a blockchain may reach a consensus regarding the validity of resources maintained with a block of the blockchain, e.g., a transaction contained on a transaction ledger, financial resources or the like. Additionally, when multiple versions of a resource, document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The blockchain chain typically has two primary types of records. The first type is the resource or transaction type, which consists of the actual data stored in the block chain. The second type is the block type, which are records that confirm when and in what sequence certain transactions became recorded as part of the blockchain. Resources or transactions are created by participants using the blockchain in its normal course of business, for example, when someone sends a resource to another person, and blocks are created by users known as "miners" who use specialized software/equipment to create blocks. Holders (also, referred to as users) of a block of the blockchain create resources or transactions that are passed around to various nodes of the block chain. A "valid" resource or transaction is one that can be validated based on a set of rules that are defined by the particular system implementing the blockchain. For example, in the case of financial resources, such as crypto-currencies or the like, a valid resource or transaction is one that is digitally signed, conducted from a valid digital wallet and, in some cases, that meets other criteria.

As mentioned above and referring to FIG. 1, a blockchain 100 is typically decentralized—meaning that a distributed ledger 120 (i.e., a decentralized ledger) is maintained on multiple nodes 110 of the blockchain 100. One node in the block chain may have a complete or partial copy of the entire ledger or set of resources or transactions and/or blocks on the block chain. Transactions are initiated at a node 110 of a blockchain 100 and communicated to the various nodes 110 of the blockchain 100. Any of the nodes 110 can validate a resource or transaction, add the resource or transaction to its copy of the blockchain 100, and/or broadcast the resource or transaction, its validation (in the form of a block) and/or other data to other nodes 110. This other data may include time-stamping, such as is used in financial resource blockchains. Various other specific-purpose implementations of blockchains have been developed. These include distributed domain name management, decentralized crowd-funding, synchronous/asynchronous communication, decentralized real-time ride sharing and even a general purpose deployment of decentralized applications. The block chain 100 shown in FIG. 1 is configured to perform one or more of the steps or functions performed by the system shown in FIG. 2.

Referring to FIG. 1 provides a schematic diagram of a system configured for managing security and controlling access to resources 140 accessible via blocks 130 in a blockchain network 100, in accordance with embodiments of the present invention. One or nodes 110 in the distributed blockchain network 100 is accessible via network 200, which may comprise the Internet and/or intranet(s). For added security, the network 200 may be comprised solely of one or more secure non-public intranets (i.e., private networks). The blockchain network 100 is capable of generating blocks 130 that include resources, which are validated by one or more nodes 110 within the blockchain network 100. In specific embodiments of the invention, the blocks may comprise at least a portion of holder's financial account(s), such that, the resources are further defined as financial resources.

In accordance with embodiments of the invention, the block holder may desire to grant users/accessors access to the resources 140, i.e., access to the corresponding block 130. For example, in those embodiments of the invention, in which, the resources comprise financial resources the block holder may desire to grant a third-party (i.e., loan/mortgage holder) or a family member/beneficiary access to the financial resources. In addition, a block holder may configure a block and the associated resources as a reward to a designated or currently undesignated user/accessor based on completion or occurrence of a triggering event (e.g., a life event, threshold number of transactions or the like).

In this regard, the system includes access control module 300 that is in communication with one or more nodes 110 of the blockchain network 100 via network 200. While FIG. 2 depicts access control module 300 being stored in an apparatus/device separate from the blockchain network 100, in other embodiments of the invention, the access control module 100 may be stored and/or accessed via one or more of the nodes 110 of the blockchain network 100.

In response to generating blocks 130 within the blockchain network 100 and validating resources 140 associated with the blocks 130, access control module 300 is configured to generate and apply to the blocks 130 one or more tags 310 that define one or more attributes associated with the corresponding block 130. In specific embodiments of the invention, in which the resources 140 are financial resources, the tags 310 may define a designated purpose for the financial resources associated. In such embodiments of the invention, the financial resources may be existing resources or future resources. In other embodiments of the invention in which the resources are transactions, the tags may define attributes of the transactions, such as the type of transaction, the type of goods and/or products associated with the transactions, the amount or amount range of the transactions, the date or date range of the transactions or the like. Tagging of the blocks may be performed in an automated fashion in response to creating a block and/or resources associated with a block (e.g., adding a transaction to a ledger or adding resources). Alternatively, in other embodiments of the invention, a block holder or the like may manually request generation of a tag(s) and define the attributes associated with the tag. In accordance with embodiments of the present invention, tagging of the blocks serves the purpose of allowing a designated user/accessor to readily locate the block 130 from within the comprehensive blockchain network 100.

Access control module 300 is further configured to generate security tokens 320 that provide one or more designated users/accessors 330 access to a block 130 and the validated resources 140 associated with the block 130. In specific embodiments of the invention, a block holder or the like, identifies the one or more designated users/accessors 330 which the block holder desires to grant block access to and, in turn, the access control module 300 generates the security token/key 320 or the like. In specific embodiments of the invention, the access control module 300 may be configured to generate a separate security token 320 for each designated users/accessors 300 or, according to other embodiments of the invention, a block holder or the like may assign a single security token 320 to a designated group of users/accessors 330. Once generated, the security token 320 may be electronically communicated to the users/accessors 330 and/or the block holder or the like may deliver the security token to the users/accessors 330.

Additionally, access control module 340 may be configured to define control logic 340 that is applied to least one of (i) the tags 310, (ii) the blocks 130, and/or (iii) the security token(s) 320. The control logic 340 provides access criteria for the one or more users/accessors 330 when attempting to access the blocks 130 and the resources 140 associated therewith. In specific embodiments of the invention, the control logic 340 may be configured such that a tag 310, a block 130 and/or the security token 320 expires after a predetermined period of time or is only valid (i.e., accessible or executable) for a specified period of time, which may include a current and/or future period of time. In other specific embodiments of the invention, the control logic 340 may be configured such that a tag 310, a block 130 and/or the security token 320 is limited in terms of use, frequency, and/or amount. For example, the control logic 340 may control (i) the portion/amount of the block 130/resources 140 that may be accessed by the designated user(s)/accessor(s) 330, (ii) the frequency of which the designated user(s)/accessor(s) 330 may access the block 130/resources 140 and/or (iii) the level or type of access granted to the designated user(s)/accessor(s) 330 or the like.

According to specific embodiments of the invention, the system may also include access portal module 400 that is in communication with one or more nodes 110 of the blockchain network 100 via network 200. While FIG. 2 depicts access portal module 400 being stored in an apparatus/device separate from the blockchain network 100, in other embodiments of the invention, the access control module 100 may be stored and/or accessed via one or more of the nodes 110 of the blockchain network 100.

Access portal module 400 is configured to grant designated users/accessors 330 access to block(s) 130 within the blockchain 100, which the users/accessors 330 have been authorized to access. For example, in those embodiments in which the validated resources are financial resources, the users/accessors 330 may access the financial resources via the access portal or, in those embodiments in which the resources are transactions, the users/accessors 330 may access the transactions on the ledgers via the access portal.

As such, access portal module 400 is configured to allow users/accessors the ability to search for blocks 130 within the blockchain by inputting one or more search terms 410 which may be responsive to attributes associated with tags 310. In the event, that a search term 410 is responsive to a tag or the tag's attributes, one or more blocks 130 are located within the blockchain and identified with the access portal to the user/accessor 330. The user/accessor 330 is granted access to the block 130 and the associated validated resources 140 by presentation/input of the security token 320. In specific embodiments of the invention, in which the tags 310, the blocks 130 and/or the security token 320 have control logic 340 applied thereto, the access that is granted to the user(s)/accessor(s) is conditional access based on the criteria/limitations defined by the control logic 340.

Referring to FIG. 3 a block diagram is presented of an apparatus 500, which is manage security and control access to resources associated with blocks within a blockchain network, in accordance with embodiments of the present invention. In addition to providing greater detail, FIG. 3 highlights various alternate embodiments of the invention. The apparatus 500 may include one or more of any type of computing device, such as servers and the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as access control module 300 and/or access portal module 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus 500 on a network. For example, processing subsystems allow for initiating and maintaining communications and exchanging data with other networked devices. For the disclosed aspects, processing subsystems of processor 506 may include any subsystem used in conjunction with access control module 300 and/or access portal module 400 and related algorithms, sub-algorithms, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

As previously discussed in relation to FIG. 2, the memory 504 of apparatus 500 stores access control module 400 that is configured to manage security and control access to blocks within a blockchain network, in accordance with embodiments of the present invention.

In response to generating blocks 130 within the blockchain and validating resources associated with the blocks 130, access control module 300 is configured to generate and apply to the blocks 130 one or more tags 310 that define one or more attributes associated with the corresponding block 130.

In specific embodiments of the invention, in which the resources 140 are financial resources, the tags 310 may define a designated purpose for the financial resources associated. For example, a block 130 may be tagged for a house repair, an automobile repair, an automobile loan or the like. Once tagged for a designated purpose, logic within the block 130 may require that financial resources within the block be used/allocated for only the designated purpose. The designated purpose may be a future purpose not yet realized, as such the financial resources in the block may serve as a retainer for a pending purpose, i.e., pending goods/services or the like. Additionally, a block holder may remove a tag 310 that designates a purpose and "re-assign" and/or 're-purpose" a block 130 via a new or update tag 130. In the event that the designated purpose is determined, by the access control module 300, to no longer exist (i.e., the purpose has been met/fulfilled or has otherwise ceased to exist), the block the tag 310 may be automatically removed from the block 130 and the block may revert back to the previous designation/tag or the block may be deemed as generic (without a designated purpose). In such embodiments of the invention, the financial resources may be static existing resources or dynamic fluctuating or future resources.

In other embodiments of the invention in which the resources are transactions, the tags 310 may define attributes of the transactions, such as the type of transaction, the type of goods and/or products associated with the transactions, the amount or amount range of the transactions, the date or date range of the transactions or the like. Tagging of the blocks may be performed in an automated fashion in response to creating a block and/or resources associated with a block (e.g., adding a transaction to a ledger or adding resources). Alternatively, in other embodiments of the invention, a block holder or the like may manually request generation of a tag(s) and define the attributes associated with the tag. In accordance with embodiments of the present invention, tagging of the blocks serves to provide for control over blocks and/or the resources associated therewith, including the purpose of the block. Additionally, tagging allows a designated user/accessor to readily locate the block 130 from within the comprehensive blockchain network 100.

Access control module 300 is further configured to generate security tokens 320 that provide one or more designated users/accessors 330 access to a block 130 and the validated resources 140 associated with the block 130. In specific embodiments of the invention, a block holder or the like, identifies the one or more designated users/accessors 330 which the block holder desires to grant block access to and, in turn, the access control module 300 generates the security token/key 320 or the like. In specific embodiments of the invention, the access control module 300 may be configured to generate a separate security token 320 for each designated users/accessors 300 or, according to other embodiments of the invention, a block holder or the like may assign a single security token 320 to a designated group of users/accessors 330. Once generated, the security token 320 may be electronically communicated to the users/accessors 330 and/or the block holder or the like may deliver the security token to the users/accessors 330. Additionally, the security token 320 may be delivered by other means, such as included within a will, living will or the like.

Additionally, access control module 340 may be configured to define control logic 340 that is applied to least one of (i) the tags 310, (ii) the blocks 130, and/or (iii) the security token(s) 320. The control logic 340 provides access criteria for the one or more users/accessors 330 when attempting to access the blocks 130 and the resources 140 associated therewith. In specific embodiments of the invention, the control logic 340 may be configured with a time period 342 such that a tag 310, a block 130 and/or the security token 320 expires after a predetermined period of time or is only valid (i.e., accessible or executable) for a specified period of time, which may include a current and/or future period of time. In this regard, the designate user(s)/accessors may only be granted temporary access to the block 130 and associated resources or only granted access in the future, which also be for a temporary period of time or based on an event (e.g., upon death as prescribed in a will or like)

In other specific embodiments of the invention, the control logic 340 may be configured such that a tag 310, a block 130 and/or the security token 320 is limited in terms of amount, frequency, and/or type of access 344. For example, the control logic 340 may control (i) the portion/amount of the block 130/resources 140 that may be accessed by the designated user(s)/accessor(s) 330. In this regard, the control logic 340 may designate a specific amount, minimum or maximum threshold of amount, or portion (percentage or the like) of the resources available to a designated user/accessor 330. In addition, the control logic 340 may define the frequency of which the designated user(s)/accessor(s) 330 may access the block 130/resources 140 of accesses and/or the number of times that the resources may be used by the user/accessor 330. Moreover, the control logic 340 may define the level or type of access granted to the designated user(s)/accessor(s) 330, such as the purpose or the like or the level type of the block/resource (e.g., in those embodiments in which the resources are financial resources the control logic 340 may define that resources are for a loan, credit, debits or the like).

The memory 504 of apparatus 500 additionally includes access portal module 400 that is configured to grant designated users/accessors 330 access to block(s) 130 within the blockchain 100, which the users/accessors 330 have been authorized to access. For example, in those embodiments in which the validated resources are financial resources, the users/accessors 330 may access the financial resources via the access portal or, in those embodiments in which the resources are transactions, the users/accessors 330 may access the transactions on the ledgers via the access portal.

As such, access portal module 400 is configured to allow users/accessors the ability to search for blocks 130 within the blockchain by inputting one or more search terms 410 which may be responsive to attributes associated with tags 310. In the event, that a search term 410 is responsive to a tag or the tag's attributes, one or more blocks 130 are located within the blockchain and identified with the access portal to the user/accessor 330.

The user/accessor 330 is granted access to the block 130 and the associated validated resources 140 by presentation/input of the security token 320. In the event that an incorrect security token 320 is presented or an unauthorized user presents the security token 320 the access portal module 400 and/or the access control module 400 is configured to automatically tag (i.e., mark the block as being compromised). In such embodiments of the invention, in which a block has been tagged as compromised, the access control module 400 may be further configured to automatically provide for a replacement block, which may be swapped in to replace the compromised block (i.e., the replacement block acts as the original block and designated users/accessors 330 can access the replacement block through presentation of the originally assigned security token).

In specific embodiments of the invention, in which the tags 310, the blocks 130 and/or the security token 320 have control logic 340 applied thereto, the access that is granted to the user(s)/accessor(s) is conditional access based on the criteria/limitations defined by the control logic 340. For example, the access may be for a designated time period, either a current time period or a future time period, for a specified portion or threshold amount of the resources, or for a specified number/frequency of accesses or the like.

Referring to FIG. 4 a flow diagram is depicted of a method 600 for managing security and access to blocks within a blockchain network, in accordance with embodiments of the present invention. At Event 610, the method is precipitated by generating one or more blocks within the blockchain network and validating the resources associated with the one or more blocks. In those embodiments in which the resources are financial resources, the financial resources, as well as the holder of the resources, may be validated. In those embodiments in which the resources are transactions, the transactions are validated as having occurred between the transactor and the transactee and for validated amount.

At Event 620, one or more tags are generated and applied to one or more blocks within the blockchain. Each tag defines one or more attributes associated with the block, such as, but not limited to, a purpose for the resources in the block. For example, in those embodiments in which the resources are financial resources, the tag may define the financial purpose of the block or the like. In such embodiments of the invention, the financial resources may be existing resources or future resources. In other embodiments of the invention in which the resources are transactions, the tags may define attributes of the transactions, such as the type of transaction, the type of goods and/or products associated with the transactions, the amount or amount range of the transactions, the date or date range of the transactions or the like. Tagging of the blocks may be performed in an automated fashion in response to creating a block and/or resources associated with a block (e.g., adding a transaction to a ledger or adding resources). Alternatively, in other embodiments of the invention, a block holder or the like may manually request generation of a tag(s) and define the attributes associated with the tag. In accordance with embodiments of the present invention, tagging of the blocks serves the define a purpose for the block and/or allowing a designated user/accessor to readily locate the block from within the comprehensive blockchain network 100.

At Event 630, a security token is generated that provides one or more designated users/accessors access to a block and the validated resources associated with the block. In specific embodiments of the invention, a block holder or the like, identifies the one or more designated users/accessors which the block holder desires to grant block access to and, in turn, generates the security token/key or the like. In specific embodiments of the invention, a separate security token is generated for each designated users/accessors or, according to other embodiments of the invention, a block holder or the like may assign a single security token to a designated group of users/accessors. Once generated, the security token may be electronically communicated to the users/accessors and/or the block holder or the like may deliver the security token to the users/accessors. As previously discussed the token may have logic defined that defines a use period (i.e., period of time) or expiration date/time. The use period may include a current time and/or a future time (i.e., the security token becomes valid in the future).

At Event 640, control logic is defined that is applied to least one of (i) the tags, (ii) the blocks, and/or (iii) the security token(s). The control logic provides access criteria for the one or more users/accessors when attempting to access the blocks and the resources associated therewith. In specific embodiments of the invention, the control logic may be configured such that a tag, a block and/or the security token 320 expires after a predetermined period of time or is only valid (i.e., accessible or executable) for a specified period of time, which may include a current and/or future period of time. In other specific embodiments of the invention, the control logic may be configured such that a tag, a block and/or the security token is limited in terms of use, frequency, and/or amount. For example, the control logic may control (i) the portion/amount of the block/resources that may be accessed by the designated user(s)/accessor(s), (ii) the frequency of which the designated user(s)/accessor(s) may access the block/resources and/or (iii) the level or type of access granted to the designated user(s)/accessor(s) or the like.

At Event 650, one or more designated users/accessors are granted access (i.e., authorized to access) at least a portion of the resources associated with the block based on presentation of the security token and application of pertinent control logic.

Thus, systems, apparatus, methods, and computer program products described above provide for managing security and access to resources associated with blocks of a distributed blockchain network. Specifically embodiments of the invention provide for creation of tags (i.e., digital markings) that can be applied to blocks so that a designated entity/user can locate the block though presentation of keywords associated with the tag. Additionally, embodiments of the invention provide for generating a security token (i.e., feature, key or the like) that is assigned or otherwise provided to the designated entity/user which is configured to grant the designated entity access to resources in the block. Moreover, logic may be defined and applied to either the tag, the block and/or the security token that provides control over the access granted to the designated entities/users. For example, the logic may define the period of time for which a designated entity/user is granted access to the block and/or the block's resources or the logic may define an amount of access granted to the designated entity/user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for self-monitoring security and access to designated blocks within a blockchain network, the system comprising:
   a distributed blockchain network comprising a plurality of decentralized nodes for storing and validating resources;
   a computing platform including a memory and at least one processor in communication with the memory; and
   an access control module, stored in the memory, executable by the at least one processor and configured to:
      in response to generating one or more blocks within the blockchain network and validating one or more resources associated with the one or more blocks,
         generate and apply to one or more of the blocks one or more tags, wherein each tag defines an attribute associated with one of the blocks,
         generate a security token, wherein the security token provides one or more designated users access to one or more of the blocks,
         define logic that is applied to at least one of (i) the one or more tags, (ii) the one or more blocks, or (iii) the security token, wherein the logic provides access criteria for the one or more designated users when accessing the one or more of the blocks, and grant the one or more designated users access to at least a portion of the resources associated with the block based on presentation of the security token and application of the logic, determine that one or more of the blocks has been compromised based on one of (i) the security token being presented by a non-designated user or (ii) an incorrect security token being presented, and in response to determining that one or more of the blocks has been comprised, generate and apply to the one or more comprised blocks a tag that identifies the one or more comprised blocks as being compromised.

2. The system of claim 1, further comprising an access portal module stored in the memory, executable by the at least one processor and configured to:

receive one or more search terms associated with at least one of the one or more tags, in response to receiving the one or more search terms, locate the one or more of the blocks based on the one or more tags, and receive the security token from one of the designated users, and in response to receiving the security token, grant the designated user access to at least a portion of the resources associated with the one or more of the blocks.

3. The system of claim 2, wherein the access portal module is further configured to apply the logic to at least one of the tags, the security token or the blocks prior to granting the designated user access to the resources.

4. The system of claim 1, wherein the access control module is further configured to define logic that provides a time period for use associated with at least one of the one or more tags, the one or more of the blocks or the security token.

5. The system of claim 4, wherein the access control module is further configured to define logic that provides the time period for use, wherein the time period for use is one of a current time period or a future time period.

6. The system of claim 1, wherein the access control module is further configured to define logic that limits an amount of access afforded to the one or more resources associated with the one or more of the blocks.

7. The system of claim 6, wherein the access control module is further configured to define logic that limits the amount of access, wherein the amount of access is one of (i) frequency of which the designated users are allowed to access the block, (ii) a level or type of access granted to the one or more resources associated with the one or more of the blocks, and (iii) a threshold limit of the one or more resources that may be accessed.

8. The system of claim 1, wherein the distributed blockchain network is configured to validate the resources in the block and verify an identity of a block holder.

9. The system of claim 1, wherein the one or more blocks are generated, each for separate financial needs or obligations, wherein the resources associated with the block are existing or future existing funds.

10. The system of claim 9, wherein the access control module is further configured to generate and apply to one or more of the blocks the one or more tags, wherein one or more of the tags defines a designated purpose for the existing or future existing funds associated with the block.

11. The system of claim 9, wherein the access control module is further configured to, in response to receiving the security token, grant the one or more designated users access to at least a portion of the funds associated with the one or more of the blocks.

12. The system of claim 1, wherein the access control module is further configured to identify and validate one or more other blocks that are configured to replace the one or more compromised blocks, wherein replacement provides for granting the one or more designated users access to at least a portion of the resources associated with the one or more other blocks based on presentation of the security token and application of the logic.

13. The system of claim 1, wherein the access control module is further configured generate a temporary security token, wherein the temporary security token provides one or more additional designated users access to the one or more of the blocks for a temporary period of time.

14. An apparatus for self-monitoring security and access to designated blocks within a blockchain network, the apparatus comprising:

a computing platform including a memory and at least one processor in communication with the memory; and an access control module, stored in the memory, executable by the at least one processor and configured to:

in response to (i) generating one or more blocks within a blockchain network and (ii) validating one or more resources associated with the one or more blocks, generate and apply to one or more of the blocks one or more tags, wherein each tag defines an attribute associated with one of the blocks, generate a security token, wherein the security token provides one or more designated users access to one or more of the blocks, and define logic that is applied to at least one of (i) the one or more tags, (ii) the one or more blocks, or (iii) the security token, wherein the logic provides access criteria for the one or more designated users when accessing the one or more of the blocks, determine that one or more of the blocks has been compromised based on one of (i) the security token being presented by a non-designated user or (ii) an incorrect security token being presented, and in response to determining that one or more of the blocks has been comprised, generate and apply to the one or more comprised blocks a tag that identifies the one or more comprised blocks as being compromised; and access portal module stored in the memory, executable by the at least one processor and configured to:

receive one or more search terms associated with at least one of the one or more tags, in response to receiving the one or more search terms, locate the one or more of the blocks based on the one or more tags, and receive the security token from one of the designated users, and in response to receiving the security token, grant the one or more designated users access to at least a portion of the resources associated with the one or more of the blocks.

15. The apparatus of claim 14, wherein the access portal module is further configured to apply the logic to at least one of the tags, the security token or the blocks granting the designated user access to the resources.

16. The apparatus of claim 14, wherein the access control module is further configured to define logic that provides at least one of (i) a time period for use associated with at least one of the one or more tags, the one or more of the blocks or the security token, and (ii) an amount of access afforded to the one or more resources associated with the one or more of the blocks.

17. A method for self-monitoring security and access to designated blocks within a blockchain network, the method comprising:

in response to (i) generating one or more blocks within a blockchain network and (ii) validating one or more resources associated with the one or more blocks;

generating, by a computing device processor, and applying to one or more of the blocks, by a computing device processor, one or more tags, wherein each tag defines an attribute associated with one of the blocks;

generating, by a computing device processor, a security token, wherein the security token provides one or more designated users access to one or more of the blocks;

defining logic that is applied, by a computing device processor, to at least one of (i) the one or more tags, (ii) the one or more blocks, or (iii) the security token, wherein the logic provides access criteria for the one or more designated users when accessing the one or more of the blocks;

granting, by a computing device processor, the one or more designated users access to at least a portion of the resources associated with the block based on presentation of the security token and application of the logic;

determining, by a computing device processor, that one or more of the blocks has been compromised based on one of (i) the security token being presented by a non-designated user or (ii) an incorrect security token being presented; and in response to determining that one or more of the blocks has been comprised, generating and applying, by a computing device processor, to the one or more comprised blocks a tag that identifies the one or more comprised blocks as being compromised.

18. The method of claim 17, wherein granting the one or more designated users access further comprises:

receiving, by a computing device processor, one or more search terms associated with at least one of the one or more tags, in response to receiving the one or more search terms, locating, by a computing device processor, the one or more of the blocks based on the one or more tags, and receiving, by a computing device, the security token from one of the designated users, and in response to receiving the security token, granting, by a computing device processor, the one or more designated users access to at least a portion of the resources associated with the one or more of the blocks.

19. The method of claim 17, wherein defining the logic further comprises defining the logic that provides at least one of (i) a time period for use associated with at least one of the one or more tags, the one or more of the blocks or the security token and (ii) an amount of access afforded to the one or more resources associated with the one or more of the blocks.

* * * * *